Dec. 4, 1951

H. ANTRANIKIAN 2,577,297

SIGNALING SYSTEM

Filed Jan. 22, 1944

INVENTOR

Haig Antranikian

Patented Dec. 4, 1951 2,577,297

UNITED STATES PATENT OFFICE 2,577,297

SIGNALING SYSTEM

Haig Antranikian, Lakewood, N. J.

Application January 22, 1944, Serial No. 519,272

9 Claims. (Cl. 332—18)

The invention concerns processes and means for signalling of the type generally designated under the name of frequency modulation signalling system. This name suggests that the signals transmitted are sounds, but it is used also with a broader meaning and it is in this broader meaning that it is used here, as the processes and means described can be applied to any form of intelligence transmission, including transmissions of telegraphic signals, sound and picture transmissions, etc., in short any signal that can be transmitted through frequency variations corresponding to variations of signal strength. This aim is attained through the use of piezo-crystals and their properties.

In the frequency modulation devices heretofore used a rather wide range (or band) of frequencies was needed; for instance, in speech transmission a range of frequencies equal to, or larger than the range of speech frequencies was needed. With the processes and means according to the present invention a considerably less width of frequency range is needed; in certain cases the variation of frequencies needed for a clear transmission of signals may amount, it is believed, to a few cycles. It must be understood, however, that the invention is not limited to these cases and that any range of frequencies consistent with the processes and means herein described and claimed is in the scope of the invention.

Accordingly, one object of the invention is to provide a process and means for changing amplitudes of electrical potentials (or currents)—herein named "signal potentials"— into corresponding variations of frequency of a carrier wave.

Another object of the invention is to provide a process and means for substantially eliminating the amplitude variations of the carrier wave.

Yet another object of the invention is to provide a process and means for tuning an oscillator to generate currents at a desired mean frequency.

Other objects of the invention will appear in the following pages.

Figure 1:
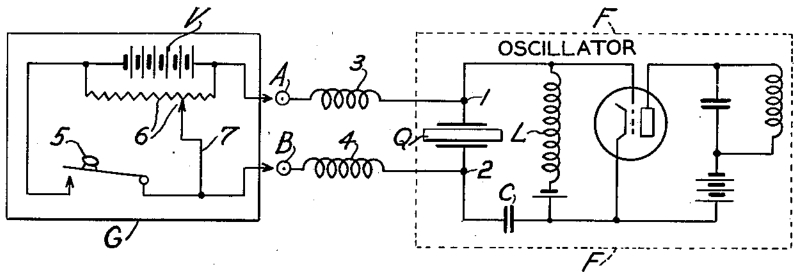
Figures 2, 3:
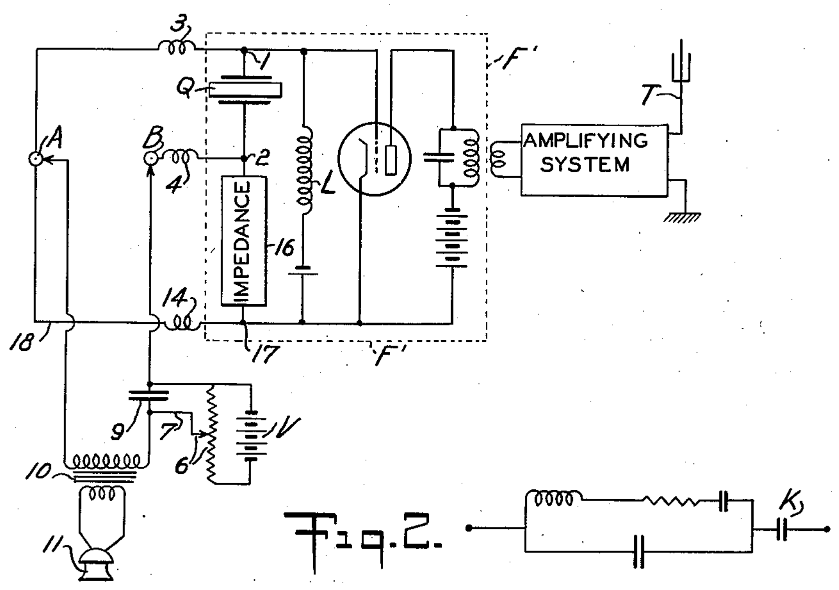
Figure 4:
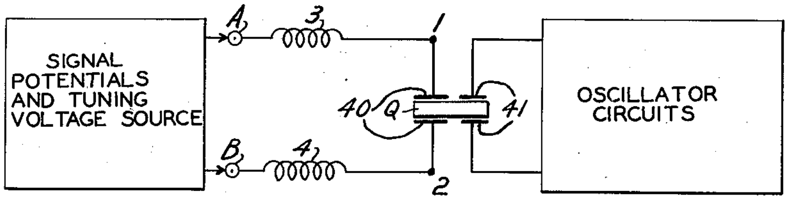

In the appended drawing, Figure 1 illustrates a simple means for carrying out the process of changing the frequencies of the currents generated by an oscillator in accordance with amplitude variations of signal potentials;

Figure 2 diagrammatically illustrates a means changing signal potentials into carrier waves of corresponding variable frequencies;

Fig. 3 is a wiring diagram of one form of impedance which may be employed in the circuit of Fig. 2; and Fig. 4 is a wiring diagram of a modified form of the present invention.

For the clear understanding of the description that follows it may be useful to point out here that the word "oscillator" will mean any oscillator which includes, and the frequencies of which are controlled by at least one piezo-crystal, and the words "oscillator circuits" will mean the same type of oscillator but without including the piezo-crystal and its electrodes, condenser foils or plates.

Referring to Figure 1, there is indicated within dotted line F an ordinary type of oscillator whose frequencies are controlled by the piezo-crystal Q, except for the condenser C which has been added for reasons that will appear later. The circuits of this oscillator are obvious and well known and, consequently, need no further description. (The output of the oscillator may be connected to any type of emitting circuits; this is not shown in the figure.) On the left of the figure is shown a device for carrying out the process of changing variable signal potentials into corresponding variable frequencies of the currents generated by the oscillator.

The signal potentials are applied to the terminals A, B, which in turn are connected to the terminals 1, 2, of a condenser comprising the piezo-crystal Q between its plates; these condenser plates may be the plates connected to the oscillator circuits, as shown in Figure 1, or they may be a different set of condenser plates or foils, for example as shown in Figure 4 where the plates 40 are connected to terminals A, B, while the plates 41 are connected to the oscillator circuits; the two sets of plates 40, 41 may be also arranged in different locations over the surface of the piezo-crystal, or in any other desired way. The connections of terminals A, B, to terminals 1, 2, are preferably made through one or more choke coils, such as those illustrated at 3, 4, or other type of high impedances at the frequencies of the currents generated by the oscillator.

In order to make the workings of the process clear there is shown in Figure 1, in the rectangle G, the example of circuits suitable for signal potentials of the ordinary telegraphic type, but any other type of signal potentials may be used between the terminals A, B. The circuits, as shown, comprise between the ends A, B, a key 5 in series with a voltage source V. There is shown, moreover, a means for applying an adjustable constant potential, in addition to the signal potentials, which comprises a potentiometer 6 and a conductor 7 connected to terminal B; the function of this additional constant potential will be explained later. It is obvious to persons familiar with the art that the closing and opening of key 5 will change the potential applied to terminals A, B—and therefore to terminals 1, 2—from one value to another and that these values may be changed to any predetermined quantity by the proper choice of the elements V and 6.

It is a well known fact that the frequency of the currents generated in an oscillator (when proper cautions of temperature, etc., are taken) depends solely on the dimensions and the mechanical properties of the piezo-crystal; it is also known that a voltage applied to the faces of the crystal, if properly located, will change its dimensions; therefore, a change of potential applied to the faces of the crystal will have for effect a change in the frequency of the currents generated by the oscillator; hence, when key 5 is open the currents generated by the oscillator will have a certain frequency depending chiefly on the dimensions of the piezo-crystal Q and the voltage applied to the terminals 1, 2, at that time; but when key 5 is closed the voltage applied to the terminals 1, 2, changes, the piezo-crystal shrinks or expands—according to the polarity of the applied voltage—and therefore the frequency of the currents generated by the oscillator will also change. The change of frequency may be very small but it may be detected by processes and means described later and may thus be used for signal transmission.

It will readily be understood by persons familiar with the art that no substantial change of amplitude of the currents generated by the oscillator will take place because of the condenser C inserted in the grid-cathode circuit (the currents of charge and discharge of the condenser C which may take place during changes of potentials will pass through impedance L, which is preferably of very low resistance).

The addition of potentiometer 6, which enables the application of an adjustable constant voltage to the piezo-crystal to be made, has one or both of the following purposes. In the first place, it may be used for a fine adjustment of the mean frequency of the currents generated by the oscillator since a voltage applied to the crystal changes its proper frequency, as explained above; in the second place, it may be used for a more thorough change of the mean frequency in order to change the frequency variations—when signal potentials are applied to the crystal—from the range of one receiving device to the range of another receiving device; thus the same crystal may be used for a number of independent, though not simultaneous, transmissions of signals. In short, the addition in question is made in order to "tune" the piezo-crystal to different proper frequencies.

As already stated, any type of signal potentials may be connected to terminals A, B, instead of the telegraphic signal potentials shown in Figure 1. For instance, for transmissions of speech or sound a microphone circuit (not shown) may be inserted instead of key 5 at the terminals of this key, as will easily be understood by persons familiar with the art.

It may often be desired to prevent amplitude variations to take place in the currents generated by the oscillator more thoroughly than with the means shown in Figure 1 (condenser C combined with impedance L). This aim may be attained by the use of a means, diagrammatically shown in Figure 2, which applies to the oscillator circuit potentials substantially equal and opposite to the signal potentials applied to the crystal, or at least to the part of these signal potentials which might set amplitude variations in the carrier waves originated at the oscillator.

The oscillator circuits within the dotted line F', in Figure 2, is almost identical to the circuits within the dotted line F in Figure 1; the only difference is that the condenser C of Figure 1 has been replaced in Figure 2 by an impedance 16 which is equivalent to the impedance of the crystal circuit between the terminals 1, 2, when the oscillator is in operation. As diagrammatically shown in Figure 2, between these terminals 1, 2, there are only the crystal and the holding condenser, but the addition of other impedances for whatever reason is not excluded from the scope of the invention. It is known that the crystal and its holding condenser, when the oscillator is in operation (that is, including inertia, friction, etc.) is equivalent to an electrical impedance and this type of impedance should preferably be used at 16 together with other impedances similar to the additional impedances that may be inserted within terminals 1, 2. The equivalence expressed above must not be taken to mean that impedance 16 must be tuned at the frequencies of the emission; for a proper operation of the oscillator, it is preferable that said impedance should not be tuned at these frequencies, and the purpose of its insertion in the circuits, as set forth above and explained below, can fairly well be obtained without tuning. A form of impedance whose elements can be chosen to fulfill all requirements is shown in Figure 3 which is readily understood; it may not always be necessary, of course, to include in impedance 16 all the elements shown in that figure; for instance, when the signal potentials comprise only frequencies very remote from the frequencies of the emission, the whole impedance might be constituted with a single condenser and still a good compensation obtained.

The circuit B, 4, 2, Q, 1, 3, A, in Figure 2 is similar to the circuit with the same reference numbers and letters in Figure 1 and does not need to be described again.

In Figure 2, however, there is added a circuit for connecting terminal 17 of impedance 16 to terminal A through wire 18 and, preferably, through a choke coil 14 similar to choke coil 3. It is readily understood that any potential applied to terminals A, B, produces substantially equal and opposite potentials between terminals 1, 2, and terminals 2, 17; these potentials acting in opposite directions on the oscillator circuits compensate one another in these circuits and, therefore, no substantial amplitude variation takes place in the currents generated by the oscillator. This compensating means does not, however, prevent changes of frequency to take place in accordance with the signal potentials applied to terminals A, B, since these potentials are still applied to the crystal in the same way as in Figure 1.

For the sake of illustration, the signal potentials applied to terminals A, B, have been supposed to be, in Figure 2, the potentials from a microphone 11 connected to these terminals A, B, through a transformer 10 and condenser 9. There is also shown a tuning means made of the adjustable voltage device V, 6, 7; it is similar to that of Figure 1 and acts in the same way. It is used for setting the mean frequency of oscillations to a predetermined value either for a fine adjustment or for shifting the emission from one range to another (these ranges not overlapping each other) as already explained. It is readily seen, moreover, that the adjustable constant voltage is insulated from the oscillator circuits by the piezo-crystal Q and by a condenser of impedance 16 (for instance by condenser k in Figure 3) and thus has no effect on the generation of the oscillations other than setting the mean frequency.

The oscillator in dotted line F' may be connected, for emission of the currents generated in the oscillator, to an antenna T through an amplifying system, as shown.

It is further obvious that the particular form of the oscillator circuits is unimportant in carrying out the process of the invention; the circuits shown in the drawing (within dotted line F or F') may be replaced by any other type of a piezo-crystal controlled oscillator; the result of the application of the signal potentials and of the tuning voltage upon the piezo-crystal will be the same in all these oscillators.

It must also be understood that, while Figure 2 illustrates the particular case of speech transmission, the transmission of any other type of intelligence is still in the scope of the invention, provided it can be changed into signal potentials, since this invention is not dependent upon the particular type of signal potentials applied to the piezo-crystals. Of course, the accessories must be in every case adequate to the type of signal to be transmitted.

It must further be understood that, though in the figures of the accompanying drawing the adjustable constant voltage is shown to be directly connected to the plates (or foils) between which the piezo-crystal is held, any other means for applying a constant voltage to said piezo-crystal may be used; for instance, it may be applied through separate plates unconnected but close to the plates (or foils) between which the crystal is held, as will be easily understood by persons familiar with the art.

Fig. 4 shows a modification of the invention shown in Fig. 1. The control signals are derived from any suitable source such, for example, as that disclosed in Fig. 1 and may be supplied through chokes 3 and 4 to the plates or electrodes 40 of the crystal Q. A second pair of plates or electrodes 41 are associated with the crystal Q and are connected in circuit with the oscillator. Frequency modulation in accordance with the control signals is effected by the arrangement of Fig. 4 in much the same manner as that described in connection with Fig. 1. However, due to the arrangement of the plates of the crystal, which engage spaced surfaces of the crystal, coupling between the control signal circuit and the oscillator circuit, such as condenser coupling, is appreciably reduced and is substantially eliminated.

What I claim is:

1. In a frequency modulated carrier waves emitting means in which a piezo-crystal controlled oscillator is used for generating the carrier waves, the process of modulating with the same piezo-crystal in accordance with signal potentials and within selectively different ranges of modulation not overlapping each other, which consists in applying substantially exclusively to the piezo-crystal said signal potentials so limited in intensity as to produce frequency modulations in narrower ranges than said selectively different ranges, additionally applying to said piezo-crystal a constant voltage otherwise unaffecting the oscillator which can be adjusted by larger amounts than said signal potentials, whereby the modulation frequencies can be shifted from one to another of said selectively different ranges, and adjusting said constant voltage to select the desired range of said selectively different ranges of modulation.

2. In combination, circuits of an oscillator the frequency of which is controlled by a piezo-crystal, a first circuit which includes in series the frequency controlling piezo-crystal, a second circuit excluding said piezo-crystal and having an impedance substantially equivalent to the impedance of said first circuit, a source of signal potentials connected to both first and second circuits whereby potentials are induced into both circuits, and means for connecting said circuits of an oscillator to said first and second circuits in such a way that the effects of the potentials induced into the first and second circuits on said circuits of an oscillator compensate each other.

3. In a frequency modulation system comprising a piezo-electric crystal controlled oscillator having an output circuit and an input circuit including said piezo-electric crystal to which amplitude modulated input signals are applied, the method of varying the output frequencies in accordance with said input signals which comprises applying components of said input signals to said crystal and applying components of said input signals to the input circuit of said oscillator in such manner as to substantially zero the effect which the input signals applied to the piezo-electric crystal would otherwise have in the input circuit of the oscillator, and adjusting the frequency range of said crystal to desired values by applying and adjusting the magnitude of a unidirectional potential across said crystal and also in opposite polarity sense to the input circuit of said oscillator whereby to zero the net unidirectional potential bias in the input circuit to said oscillator.

4. In a frequency modulation system, an oscillator circuit including an electron tube having its space discharge path connected in an output circuit and a control electrode, an input circuit connected to said control electrode, a piezo-electric crystal, an impedance in series with said crystal, said crystal and impedance being connected across said input circuit of said tube, a source of signal potentials, and means for applying signal potentials from said source across said crystal and in opposite polarity sense across said impedance whereby to apply substantially zero signal potential from said source to the control electrode of said tube.

5. In a frequency modulation system, an oscillator circuit including an electron tube having its space discharge path connected in an output circuit and a control electrode, an input circuit connected to said control electrode, a piezo-electric crystal connected across said input circuit, an inductance connected across said input circuit, and a capacitance connected in series in one leg of said input circuit, both between said crystal and said tube, a source of signal potentials, and means for applying said signal potentials across said crystal, said inductance being of such value as to have low impedance at the frequencies of said signal potentials but high impedance at the vibration frequencies of said piezo-electric crystal and said capacitance being of such value as to have high impedance at the frequencies of said signal potentials but low impedance at the vibration frequencies of said piezo-electric crystal.

6. In a frequency modulation system comprising a piezo-electric crystal controlled oscillator having an output circuit and an input circuit including said piezo-electric crystal to which amplitude modulated input signals are applied, the method of varying the output frequencies in accordance with said input signals which comprises applying components of said input signals to said crystal and applying components of said input signals to the input circuit of said oscillator in said manner as to substantially zero the effect which the input signals applied to the piezo-electric crystal would otherwise have in the input circuit of the oscillator, and adjusting the frequency range of said crystal to desired values by applying and adjusting the magnitude of a unidirectional potential across said crystal.

7. In a frequency modulation system, an oscillator circuit including an electron tube having its space discharge path connected in an output circuit and a control electrode, an input circuit connected to said control electrode, a piezo-electric crystal connected in said input circuit, a source of signal potentials, means for connecting said signal source across said piezo-electric crystal, and means for connecting said source to said input circuit in a manner such as to oppose the signal potential applied to said control electrode by way of said crystal and to reduce the net signal potential from said source on said control electrode substantially to zero, an adjustable source of direct potential, and means for connecting said direct potential source across said piezo-electric crystal.

8. In a frequency modulation system, an oscillator circuit including an electron tube having its space discharge path connected in an output circuit and a control electrode, an input circuit connected to said control electrode, a piezo-electric crystal connected in said input circuit, a source of signal potentials, means for connecting said signal source across said piezo-electric crystal, and means for connecting said source to said input circuit in a manner such as to oppose the signal potential applied to said control electrode by way of said crystal and to reduce the net signal potential from said source on said control electrode substantially to zero, an adjustable source of direct potential, and means for connecting said direct potential source across said piezo-electric crystal, and means for connecting said direct potential source to said input circuit in opposite polarity sense to the direct potential applied to said crystal whereby to zero the net direct potential bias on the control electrode of said tube.

9. In a frequency modulation system, an oscillator circuit including an electron tube having its space discharge path connected in an output circuit and a control electrode, an input circuit connected to said control electrode, a piezo-electric crystal, an impedance in series with said crystal, said crystal and impedance being connected across said input circuit of said tube, a source of signal potentials and means for applying signal potentials from said source across said crystal and in opposite polarity sense across said impedance whereby to apply substantially zero signal potential from said source to the control electrode of said tube, an adjustable source of direct potential, and means for connecting said direct potential source across said piezo-electric crystal and in opposite polarity sense across said impedance whereby to zero the net direct potential bias on the control electrode of said tube.

HAIG ANTRANIKIAN.

REFERENCES CITED

The following references are of record in the file of this patent:

UNITED STATES PATENTS

| Number | Name | Date |
|---|---|---|
| 1,861,462 | Trouant | June 7, 1932 |
| 1,867,567 | Hansell | July 19, 1932 |
| 1,938,657 | Hansell | Dec. 12, 1933 |
| 1,950,406 | Hoorn | Mar. 13, 1934 |
| 2,054,431 | Lindenblad | Sept. 15, 1936 |
| 2,071,564 | Nicolson | Feb. 23, 1937 |
| 2,085,008 | Crosby | June 29, 1937 |
| 2,114,335 | Crosby | Apr. 19, 1938 |
| 2,205,847 | Crosby | June 25, 1940 |
| 2,212,338 | Bown | Aug. 20, 1940 |
| 2,233,199 | Donley | Feb. 25, 1941 |
| 2,274,486 | Koch | Feb. 24, 1942 |
| 2,301,828 | Stone | Nov. 10, 1942 |
| 2,306,555 | Mueller | Dec. 29, 1942 |
| 2,309,083 | Usselman | Jan. 26, 1943 |
| 2,312,079 | Crosby | Feb. 23, 1943 |
| 2,313,850 | Usselman | Mar. 16, 1943 |